United States Patent [19]

Schwob

[11] Patent Number: 4,471,541
[45] Date of Patent: Sep. 18, 1984

[54] STEAM IRON SOLE-PLATE COVER AND ITS METHOD OF ASSEMBLY

[75] Inventor: Pierre Schwob, Lyons, France
[73] Assignee: SEB S.A., Selongey, France
[21] Appl. No.: 302,610
[22] Filed: Sep. 15, 1981

[30] Foreign Application Priority Data

Sep. 24, 1980 [FR] France ............................... 80 20462

[51] Int. Cl.³ ........................................... D06F 75/38
[52] U.S. Cl. ...................................... 38/77.8; 38/77.9; 29/522 R
[58] Field of Search ...................... 29/522 R, 511, 520; 38/93, 77.9, 77.82, 77.5, 77.7, 85, 77.8; 220/354, 352

[56] References Cited

U.S. PATENT DOCUMENTS

| | | |
|---|---|---|
| 2,846,793 | 8/1958 | Studer . |
| 3,000,093 | 9/1961 | Wredenfors ............... 29/522 R X |
| 3,260,005 | 7/1966 | Loomis ........................ 38/77.9 X |
| 3,290,077 | 12/1966 | LaBarge ....................... 29/522 R |
| 3,338,456 | 8/1967 | Kinnavy et al. .................. 220/354 |
| 3,341,932 | 9/1967 | Haller ........................ 29/522 R X |
| 3,602,980 | 9/1971 | Heffner ...................... 29/522 R X |
| 4,057,885 | 11/1977 | Giger et al. ................. 29/522 R X |
| 4,389,766 | 6/1983 | Capuano ..................... 29/522 R X |

Primary Examiner—Werner H. Schroeder
Assistant Examiner—Andrew M. Falik
Attorney, Agent, or Firm—Young & Thompson

[57] ABSTRACT

A cover having a flat top surrounded by a side wall is fixed on the sole-plate of a steam iron by force-fitting a peripheral flange of the cover within a channel formed in the sole-plate. By making use of a pressure roller, one edge of the channel is upset and flattened in order to set the cover flange within the channel.

6 Claims, 11 Drawing Figures

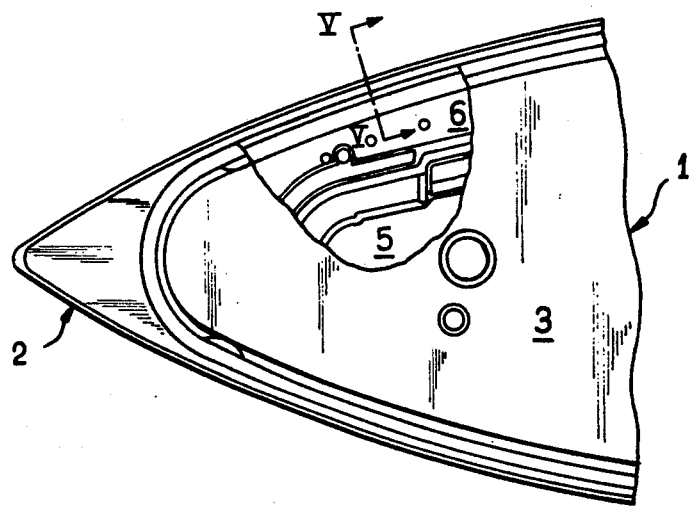
FIG_1
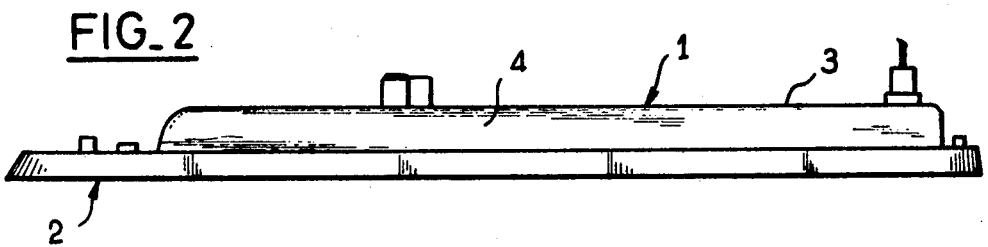
FIG_2
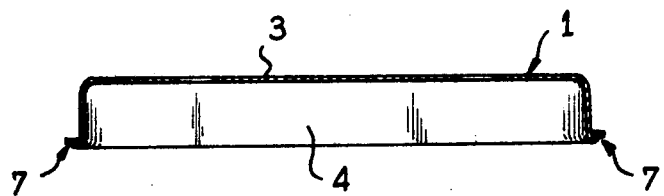
FIG_3
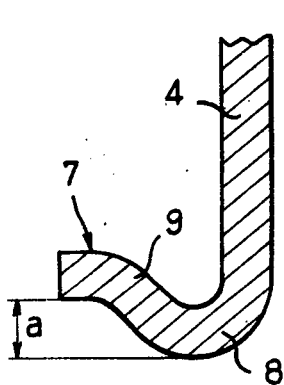
FIG_4
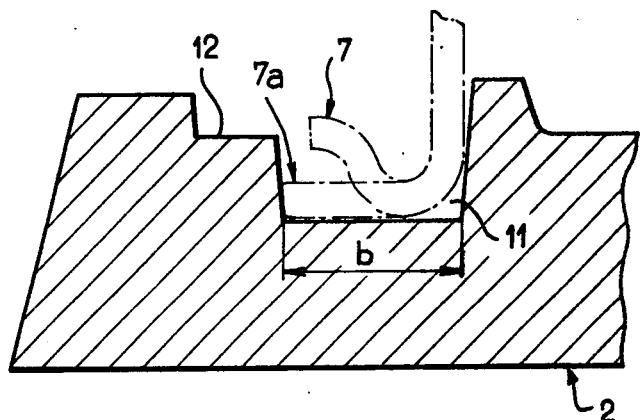
FIG_5

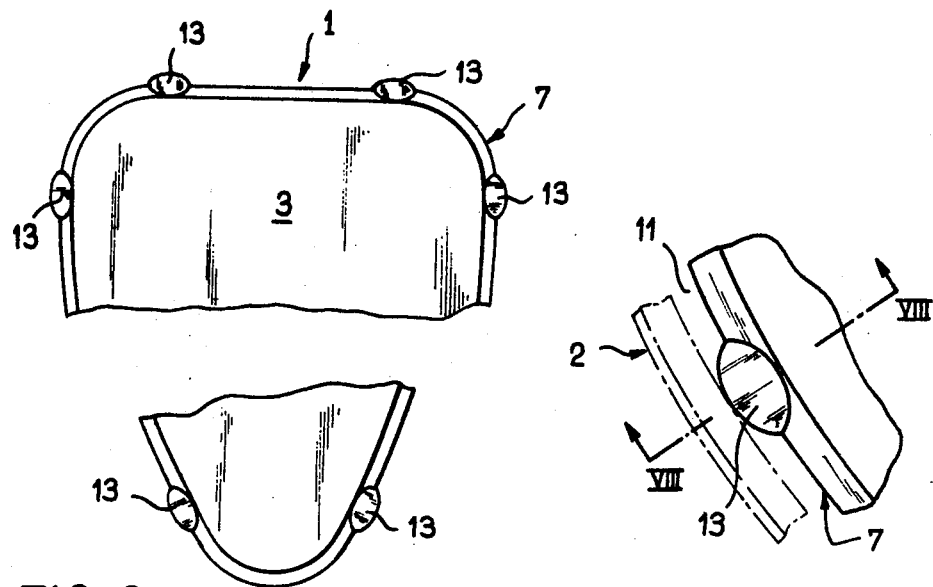
FIG_6  FIG_7
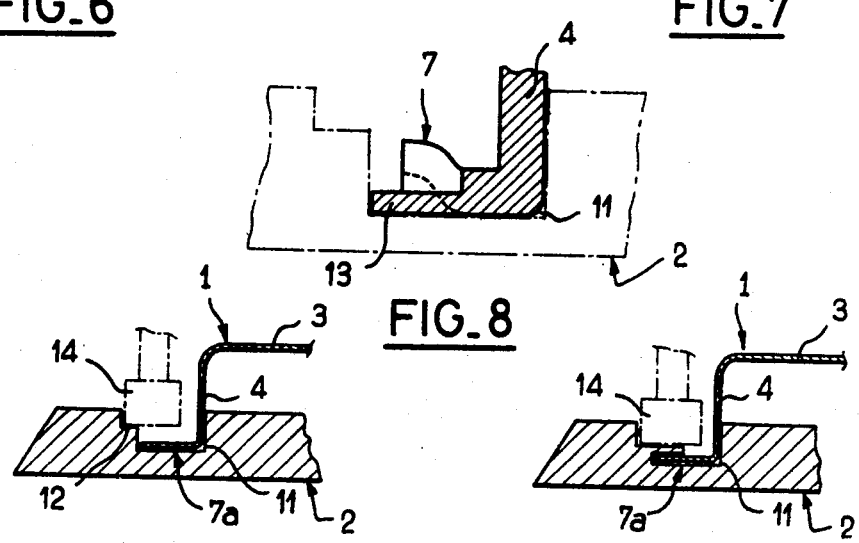
FIG_8
FIG_9  FIG_10
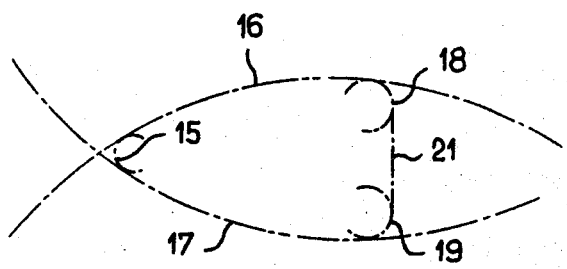
FIG_11

STEAM IRON SOLE-PLATE COVER AND ITS METHOD OF ASSEMBLY

This invention relates to a method for fixing a cover on the sole-plate of a steam laundry iron.

The invention also relates to a cover blank or starting element for carrying out said method and a laundry iron obtained by application of said method.

Steam irons usually have a vaporization chamber together with a number of different intermediate chambers which communicate with this latter and serve to distribute the steam to the different orifices located on the underface of the sole-plate. Said chambers are separated from each other by partition-walls which are integral with the sole-plate. A flat-topped cover is so arranged as to extend over the entire sole-plate and to complete the formation of the chambers by bearing on the top edges of the partition-walls.

It is necessary to attach the side wall of the cover to the sole-plate in a leak-tight manner in order to prevent any undesirable escape of steam.

It is a known practice to carry out this attachment operation by making use of mechanical means and to ensure leak-tightness by interposition of a suitable material.

However, this method does not ensure highly reliable leak-tightness. Furthermore, the degree of mechanical strength achieved is uncertain unless an improved design of attachment is adopted, thereby entailing the need for costly machining operations.

The aim of this invention is to provide a method of attachment which offers both excellent mechanical strength and highly reliable leak-tightness while at the same time being economical to construct.

According to a first aspect of the invention, the method whereby a cover having a flat top wall surrounded by a side wall is attached to the sole-plate of a steam iron essentially consists in performing the following operations in succession:

(a) the side wall of the cover is provided with an outwardly directed peripheral flange which is generally parallel to the flat top of said cover and a peripheral channel is formed in the sole-plate for accommodating said flange;

(b) the cover is placed in position by engaging the flange of said cover within the channel;

(c) the metal of the sole-plate is flattened by compression over the full length of the channel in order to cover the flange aforesaid at least to a partial extent.

The flange of the cover is thus set in the relatively malleable light alloy which constitutes the sole-plate. A continuous high-strength attachment is thus obtained while at the same time achieving a high standard of leak-tightness. Furthermore, no machining of the sole-plate is necessary and the insetting operation proper can readily be performed on automatic machines.

In a preferred embodiment of the invention, a distinctive feature of the method lies in the fact that, at the time of manufacture of the cover, the flange is upwardly displaced towards the flat top of said cover by means of two successive but oppositely directed curved portions joined to the side wall and that, between the aforementioned operations (b) and (c), the flange is pressed into the channel in order to flatten said flange and thus to reduce the relative upward displacement of this latter to zero.

Flattening of the flange is accompanied by widening of this latter. Said flange is thus permitted to engage in a tight fit within the sole-plate and is temporarily secured prior to the final insetting operation. Furthermore, said flattening operation has the effect of compensating for any faulty parallel alignment between the assembled elements.

In an advantageous embodiment of the invention, and before the cover is placed in position on the sole-plate, the flange of said cover is flattened so as to form a predetermined number of localized zones for reducing the thickness of the flange in these zones while causing expansion of said flange towards the periphery.

At the time of manufacture, a predetermined clearance (of very small value) is provided between the flange and the walls of the channel. The formation of the expanded zones makes it possible to obtain a corresponding number of keying points at which said clearance is suppressed, thus permitting immediate handling of the assembly prior to any further operation.

Preferably, the insetting operation is carried out by means of a moving pressure roller and the cover is given a contour composed of circular arcs and straight lines. The assembly consisting of cover and sole-plate is passed successively through machines and each machine carries out the displacement of one pressure roller respectively along a circular arc or along a straight line.

This mode of procedure makes it possible to design the machines on the basis of simple mechanical kinematics.

According to a second aspect of the invention, the blank for the cover of a steam iron has a flat top and a side wall provided with a flange which is generally parallel to said flat top. A distinctive feature of the invention lies in the fact that the flange of said cover is joined to the side wall by means of a curved portion bent-back at an angle of at least 90° followed by another curved portion which is bent-back in the opposite direction in order to displace said flange towards the plane of said flat top.

According to a third aspect of the invention, the steam iron comprises a cover fixed on a sole-plate by means of a peripheral flange of said cover, and is distinguished by the fact that said flange is set in the sole-plate by upsetting and flattening the metal of said sole-plate.

Further distinctive features of the invention will be more apparent upon consideration of the following description and accompanying drawings, wherein:

FIG. 1 is a fragmentary, cutaway plan view of an assembly according to the invention for mounting a cover on a sole-plate;

FIG. 2 is a view in elevation of said assembly;

FIG. 3 is a transverse sectional view of the cover alone;

FIG. 4 is a sectional view to a large scale showing the flange of the cover;

FIG. 5 is a sectional view to a large scale, this view being taken along line V—V of FIG. 1;

FIG. 6 is a plan view of the cover during manufacture;

FIG. 7 is a fragmentary plan view showing the insertion of the flange within the channel of the sole-plate;

FIG. 8 is a sectional view taken along VII—VII of FIG. 7;

FIGS. 9 and 10 are sectional views showing the flattening of the metal of the sole-plate;

FIG. 11 is a diagrammatic plan view showing the kinematic principle involved in the operation of the insetting machines.

Referring to FIGS. 1 to 3, a sheet metal cover 1 is mounted on the sole-plate 2 of a steam iron in such a way that its flat top or base wall 3 and side wall 4 serve to complete a certain number of steam chambers such as the chambers 5 and 6.

Prior to mounting on the sole-plate, the side wall 4 of the cover is provided with a flange 7 which is generally flat and parallel to the flat top 3 (as shown in FIGS. 3 and 4). Said flange is joined to the wall 4 by means of a curved portion 8 which is bent-back at an angle of more than 90°, followed by a curved portion 9 which is bent-back in the opposite direction (as shown in FIG. 4), with the result that the plane of the flange is relatively displaced by a distance a towards the plane of the flat top 3 of the cover. In the example herein described, the distance a is 1 mm.

The sole-plate 2 has a peripheral channel 11 formed along the contour of the cover. The width b of the channel 11 is such that the flange 7 can be inserted in this latter with a small clearance (as shown in FIG. 5). In the example herein described, said clearance has a value of 0.2 mm. In addition, the width b is smaller than the developed width of the flange 7.

It will be noted that the different clearances as well as certain dimensions have been highly exaggerated in the drawings for the sake of enhanced clarity.

Finally, a flat step 12 is formed in the edge portion of the channel 11 on the side nearest the outer edge of the sole-plate.

The method adopted for mounting the cover on the sole-plate will now be described.

In a first operation, the flange 7 is flattened locally so as to form a predetermined number of zones 13 which are uniformly spaced around the periphery of the cover (as shown in FIG. 6). In the example herein described, said zones are six in number and the expansion of metal which results from said flattening operation has the effect of increasing the perimeter of the flange 7 until this latter fully occupies and even extends beyond the clearance provided between the flange 7 and the channel 11.

The flange is then force-fitted within the channel (as shown in FIGS. 7 and 8) and the zones 13 of reduced thickness which entail the need for forcible engagement of said flange constitute a corresponding number of anchoring points which provide a sufficient degree of interlocking of the assembly to permit of subsequent handling.

The entire flange 7 is then compressed by means of a press under a force of 95,000 DaN in such a manner as to form a flat flange 7a (as shown in FIG. 5), the distance a of relative upward displacement being thus reduced to zero. As a result of this flattening operation, the flange completely occupies the channel 11 while at the same time eliminating all residual clearances and compensating for any deviations from parallel alignment even by exerting a force on the channel wall.

A pressure roller 14 is then applied against the flat step 12 under a force of 500 DaN (as shown in FIG. 9) in order to widen-out the stepped outer portion of the channel 11 (as shown in FIG. 10) and then to inset the flange 7a within the metal of the sole-plate which has thus been upset.

In order to simplify the kinematics governing the displacement of the pressure roller, the contour chosen for the cover is constituted by circular arcs 15, 16, 17, 18, 19 and by a straight line 21 (as shown in FIG. 11). The assembly is transferred to six successive machines which are each adapted to carry one pressure roller for successively insetting the aforesaid portions of contour.

The assembly thus obtained is wholly leak-tight and does not entail the need for any plastic seal. In addition, it provides a highly reliable mechanical attachment. Finally, the construction of the assembly can be fully automated and is highly economical.

As will readily be apparent, the invention is not limited to the example hereinabove described but extends to any minor variant in regard to both the method of assembly and the parts to be assembled. In particular, the flange of the cover could be given any wavy cross-sectional shape other than that described on condition that its developed width is greater than the width of the bottom of the sole-plate channel.

What is claimed is:

1. A method whereby a cover of deformable sheet metal having a flat top surrounded by a side wall is attached to the sole-plate of a steam iron in such a way that the flat top wall of said cover defines with the sole-plate at least one steam chamber, wherein said method consists in performing the following operations in succession:
   (a) the side wall of the cover is provided with an outwardly directed peripheral flange which is generally parallel to the flat top of said cover and has a wavy cross-sectional shape and a peripheral channel is formed in the sole-plate for accommodating said flange, the developed width of said flange being greater than the width of the bottom of said channel;
   (b) the cover is placed in position by engaging the flange of said cover within the channel;
   (c) the flange is pressed into the channel in order to flatten said flange;
   (d) the metal of the sole-plate is flattened by compression over the full length of the channel in order to cover the flange aforesaid at least to a partial extent of its width.

2. A method according to claim 1 wherein, at the time of manufacture of the cover, the flange is upwardly displaced towards the flat top of said cover by means of a junction formed by successive curved portions, and wherein, between the aforementioned operations (b) and (c), the flange is pressed into the channel in order to flatten said flange and thus to reduce the relative upward displacement thereof to zero.

3. A method according to claim 1 or claim 2 wherein, before the cover is placed in position on the sole-plate, the flange of said cover is flattened in a predetermined number of localized zones in order to reduce the thickness of said flange in said zones while causing expansion of said flange towards the periphery.

4. A method according to claim 1, wherein the flattening operation aforesaid is carried out by means of at least one moving pressure roller.

5. A method according to claim 4, wherein the cover is given a contour composed of circular arcs and straight lines and the assembly consisting of cover and sole-plate is passed successively through machines, each machine being adapted to carry out the displacement of one pressure roller respectively along a circular arc or along a straight line.

6. A steam iron having a sole-plate and a cover of deformable sheet metal having a flat top wall surrounded by a side wall in such a way that the flat top wall of said cover defines with the sole-plate at least one steam chamber, said side wall of the cover having an outwardly directed peripheral flange which is generally parallel to the flat top of the cover and has a wavy cross-sectional shape a peripheral channel formed in the sole-plate for accommodating said flange, the developed width of said flange being greater than the width of the bottom of said channel, the cover being disposed with the flange of the cover engaged within the channel, and the metal of the sole-plate being flattened by compression over the full length of the channel in order to cover said flange at least to a partial extent of its width.

* * * * *